United States Patent

Horton

Patent Number: 5,433,246
Date of Patent: Jul. 18, 1995

[54] PRESSURE COUPLING FOR CLEANING WATER LINES

[76] Inventor: George F. Horton, 3224 Parks Rd., Benton, La. 71006

[21] Appl. No.: 223,439

[22] Filed: Apr. 5, 1994

[51] Int. Cl.⁶ .............................................. B67D 5/37
[52] U.S. Cl. .................................. 137/565; 137/357; 137/209; 137/148; 137/801
[58] Field of Search ............... 137/203, 204, 565, 801, 137/209, 357; 251/148

[56] References Cited

U.S. PATENT DOCUMENTS

| | | | |
|---|---|---|---|
| 1,495,671 | 5/1924 | Castellano | 137/203 |
| 2,702,201 | 2/1955 | Romanelli et al. | 235/8 |
| 3,101,091 | 8/1963 | Schultz | 137/204 |
| 4,239,184 | 12/1980 | Dudar | 251/149.6 |
| 4,355,652 | 10/1982 | Perkins | 137/15 |
| 4,755,112 | 7/1988 | Houser | 417/440 |
| 4,776,362 | 10/1988 | Domingue | 137/59 |
| 4,881,567 | 11/1989 | Rockower | 137/203 |
| 5,211,782 | 5/1993 | Thelen | 152/47 |
| 5,240,028 | 8/1993 | Hoch, Jr. | 137/80 |
| 5,247,963 | 9/1993 | Hostetler | 137/454.6 |

FOREIGN PATENT DOCUMENTS 63859 7/1864 France ................. 137/204

Primary Examiner—A. Michael Chambers
Attorney, Agent, or Firm—John M. Harrison

[57] ABSTRACT

A pressure coupling for facilitating connection of an air pump with a water faucet to expel water from water lines connected with the faucet by operation of the air pump. In a preferred embodiment the pressure coupling includes a valve stem threadably seated in a metal cap which threads on the spout of the faucet. The hose of a manual or automatic air pump is threaded on the valve stem to pump air from the air pump into the faucet and through the water pipes connected to the faucet to clear the pipes of water and prevent the pipes from freezing and bursting in freezing weather.

9 Claims, 1 Drawing Sheet

U.S. Patent July 18, 1995 5,433,246
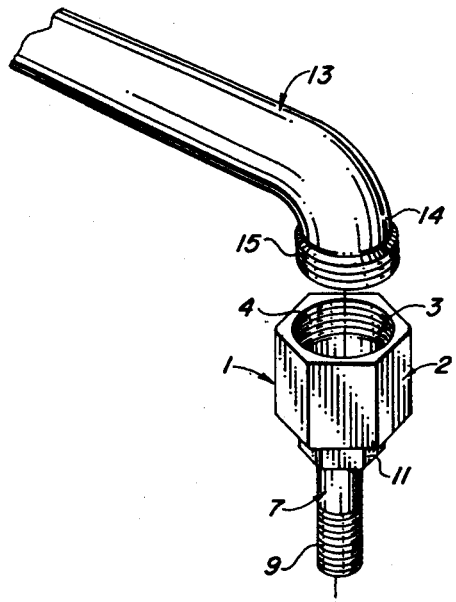
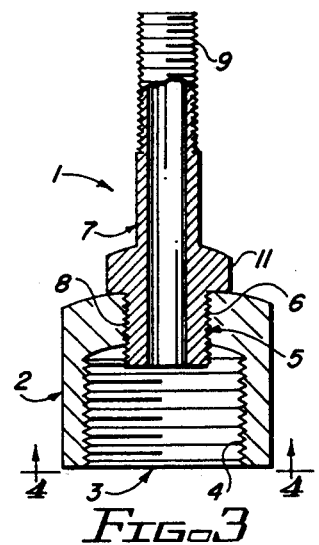
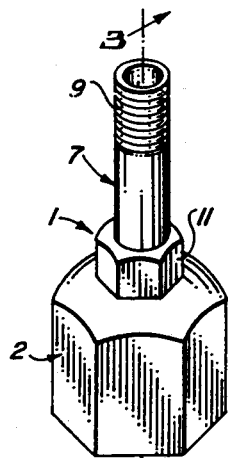
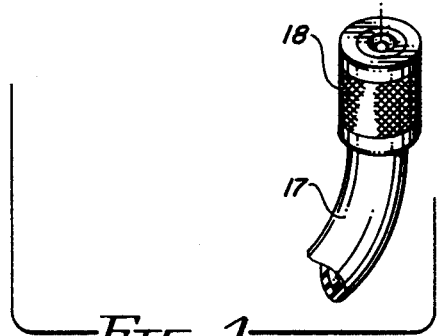
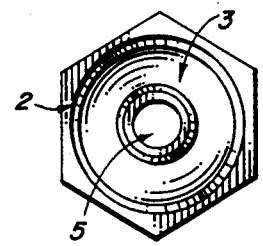
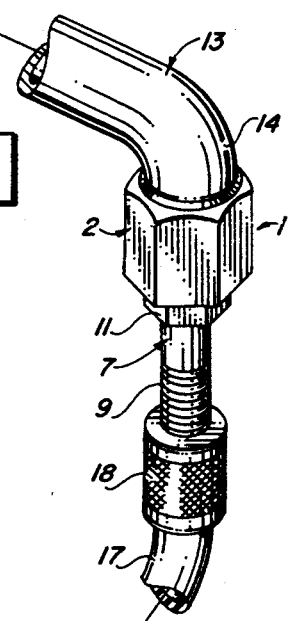

PRESSURE COUPLING FOR CLEANING WATER LINES

BACKGROUND OF THE INVENTION

Field of the Invention

This invention relates to devices for evacuating water from water lines and more particularly, to a pressure coupling for facilitating attachment of an air pump to a water faucet to pump air into the faucet and through the water lines and clear the lines of water. In a preferred embodiment the pressure coupling includes a conventional valve stem, one end of which is threadably seated in a metal cap which threadably receives the spout of a water faucet. The opposite end of the valve stem threadably attaches to an air hose connected with a manual or automatic air pump. After the water supply serving the pipes connected with the faucet is turned off, operation of the air pump forces air through the valve stem, faucet and pipes. Water remaining in the pipes is expelled therefrom through additional faucets which are also connected to the pipes and opened prior to operation of the air pump.

One of the most irritating aspects of freezing weather is that exposed water pipes often crack and break due to expansion of freezing water remaining in the pipes after the water supply serving the pipes has been turned off. When ambient temperature returns to levels above freezing, a supply of running water cannot be maintained to the building since the damaged pipe or pipes leak. The pressure coupling device of this invention is designed to facilitate quick and convenient connection of a manual or automatic air pump with a water faucet to facilitate pumping air through the pipes connected to the faucet and evacuation of excess water remaining in the pipes after the water supply serving the pipes has been turned off, such that the pipes will not expand and break in freezing weather.

2. Description of the Prior Art

Several devices are known in the art for expelling liquid from a pipe or other liquid container. U.S. Pat. No. 3,101,091, dated Aug. 20, 1963, to Forrest O. E. Schultz, discloses a "Moisture Injection Valve" for removing moisture from compressed air systems. A chamber located in the valve housing is first moved to a location adjacent to an opening provided in the housing for receiving a charge of air and water from the system. The chamber then moves to a position isolated from the system and discharges the moisture to the atmosphere. U.S. Pat. No. 4,239,184, dated Dec. 16, 1980, to Walter H. Dudar, describes a "Valve Stem" including an adaptor which fits on vehicle tire stems to allow the attachment of quick connect and disconnect connectors to the valve stem. U.S. Pat. No. 4,355,652, dated Oct. 26, 1982, to Lawrence B. Perkins, details a "Purging Device" for purging liquid from a conduit using pressurized gas. The device includes a gas-holding reservoir connected with a supply of pressurized gas and the liquid-carrying conduit. In response to a first signal, a first valve isolates the gas reservoir from the supply of pressurized gas and a second valve communicates the reservoir with the conduit. In response to a second signal, the first valve communicates the reservoir with the supply of pressurized gas and the second valve isolates the reservoir from the conduit. The first signal indicates when the conduit is carrying liquid and the second signal indicates when the conduit can be purged. U.S. Pat. No. 4,755,112, dated Jul. 5, 1988, to John R. Houser, et al, discloses a "Water/Air Pumping System" including a flat, primary reservoir, a header tank and a pump. At least one reciprocating piston is accommodated in the tank and eccentric drive cams provided on the pistons are directly connected with a motor-driven shaft. The shaft drives the pistons, which pump water or air from the reservoir and into the tank. A water and/or air supply horizontally connected with the reservoir selectively passes the air or water to the reservoir through a control valve. U.S. Pat. No. 4,776,362, dated Oct. 11, 1988, to Chris J. Dominigue, Sr., et al, discloses a "Relief Valve For Fluid Line" for preventing water pipes from breaking in freezing weather and characterized by a substantially cylindrical external valve body, including an internal bore. The valve body is perpendicularly clamped on a water pipe, the bore positioned over an opening provided in the pipe. An internal stem including a tip for reversibly extruding through the opening in the pipe is slidably accommodated in the bore. A piston housed within the valve body is vertically movable from a first position blocking fluid flow from the pipe up through the bore, and a second position allowing fluid to first enter the bore and then a drain port. A spring member positioned above the valve head biases the piston downwardly in a normally closed position. U.S. Pat. No. 5,211,782, dated May 18, 1993, to Donald Thelen, details a "Valve Assembly For Tubeless Tire" including a valve stem having external threads and a valve core positioned in an axial passage provided in the valve stem. The valve stem is installed in an opening provided in a wheel rim using a lock nut that secures the stem to the rim. U.S. Pat. No. 5,240,028, dated Aug. 31, 1993, to John R. Hoch, Jr., et al, details a "Temperature-Sensitive Water Supply Shut-Off System" including a shutoff valve movable between open and closed positions in a line leading from the water supply. An electric motor which actuates the shutoff valve actuates the valve to the open position when the circuit is closed, allowing water to flow through the line. At least one temperature sensor feeds a signal to a logic circuit that controls a switch which cuts off the supply of power to the electric motor when the sensor senses freezing temperatures. U.S. Pat. No. 5,247,963, dated Sep. 28, 1993, to Eldon Hostetler, et al, details a "Flush Apparatus For Watering Systems" including a bypass of the upstream pressure regulator, self-sealing caps for the standpipes and a readity-disassembleable automatic flush valve provided in the end of the water suppy line. A shutoff valve provided in the bypass is operable manually or automatically in response to a timer, environmental sensor or water condition sensor. The automatic flush valve connects the supply line with a drain hose and opens in response to a predetermined water pressure level in the supply line.

An object of this invention is to provide a pressure coupling for facilitating quick and easy attachment of an air pump with a water faucet to allow the evacuation of water from water pipes connected to the faucet by pumping air through the pipes.

Another object of this invention is to provide a pressure coupling characterized by a valve stem threadably seated in a metal cap for threadable attachment to a water faucet, which valve stem is adapted for removable attachment to an air hose connected to a manual or automatic air pump for forcing air through the coupling, water faucet and water pipes connected to the faucet and expelling water from the pipes through additional, open water faucets also connected with the pipes.

Still another object of this invention is to provide a pressure coupling for accommodating unidirectional flow of pressurized air from an air pump and into a water faucet, which pressure coupling is characterized by a metal cap including a cylindrical cavity having multiple, interior cavity threads for engaging faucet threads provided on the exterior of a faucet spout and a valve stem removably threadably mounted in the coupling cap and threadably attachable to an air hose connected to the air pump, such that by operation of the air pump air is forced through the hose, coupling, faucet and water pipes connected to the faucet to expel water from the pipes and thus prevent the water from freezing and breaking the pipes in freezing weather.

SUMMARY OF THE INVENTION

These and other objects of the invention are provided in a pressure coupling for facilitating quick and easy attachment of a manual or automatic air pump to a water faucet spout to accommodate unidirectional flow of pressurized air from the pump and into the faucet, which pressure coupling is characterized by a valve stem threadably seated in a metal or plastic cap including a cylindrical cavity having multiple cavity threads for engaging faucet threads included on the exterior circumference of the faucet spout. The valve stem threadably receives an air hose connected to the air pump and by operation of the pump, air is forced from the air hose and through the valve stem, faucet and water pipes connected to the faucet to force water remaining in the pipes after the water supply serving the pipes has been shut off, through additional faucets also connected with the pipes, such that the pipes will not crack or break in freezing weather.

BRIEF DESCRIPTION OF THE DRAWINGS

The invention will be better understood by reference to the accompanying drawing, wherein:

FIG. 1 is a perspective view of a preferred embodiment of the pressure coupling of this invention, more particularly detailing a preferred technique for mounting the pressure coupling on the spout of a water faucet and an air hose on the pressure coupling;

FIG. 2 is a perspective view of the pressure coupling, illustrated in an inverted orientation;

FIG. 3 is a sectional view of the inverted pressure coupling, taken along section lines 3—3 in FIG. 2;

FIG. 4 is a top view of the pressure coupling; and

FIG. 5 is a perspective view of the pressure coupling, more particularly detailing connection of the pressure coupling with the spout of a water faucet and connection of an air hose with the pressure coupling.

DESCRIPTION OF THE PREFERRED EMBODIMENTS

Referring initially to FIGS. 1-4 of the drawing, in a first preferred embodiment the pressure coupling of this invention is generally illustrated by reference numeral 1. The pressure coupling 1 includes a conventional valve stem 7, such as that used to inflate and deflate pneumatic tires. As illustrated in FIG. 3, one end of the valve stem 7 (illustrated as the upper end) is provided exteriorly with multiple stem threads 9. The opposite end of the valve stem 7 (illustrated as the lower end) is characterized by a circumferential expansion provided exteriorly with multiple coupling threads 8. A hexagonal wrench collar 11 is formed with and encircles the valve stem 7, adjacent to the coupling threads 8. The pressure coupling 1 includes a metal or plastic coupling cap 2, provided with a cylindrical spout cavity 3, the walls of which are interiorly shaped with multiple cavity threads 4. A cap bore 5, extending centrally through the coupling cap 2, communicates with the spout cavity 3 and is provided with interior bore threads 6 for threadably engaging the coupling threads 8 provided on the valve stem 7.

Referring now to FIGS. 1 and 5 of the drawing, the pressure coupling 1 is removably attached to a water faucet 13 having a faucet spout 14, by engaging the internal cavity threads 4 with external spout threads 15, shaped on the exterior surface of the end of the faucet spout 14. An air hose 17, provided on the end with an air hose coupling 18, is connected to a manual or automatic air pump (not illustrated). The air hose 17 is attached to the pressure coupling 1 by threadably engaging the air hose coupling 18 with the stem threads 9 provided on the end of the valve stem 7, as illustrated in FIG. 5.

The pressure coupling 1 of this invention allows unidirectional flow of air from the air pump (not illustrated), through the air hose 17 and into the water faucet 13 to evacuate water from the connecting water pipes (not illustrated) serving the water outlets of a building. The water supply serving the building is first turned off and all the faucets in the building, including those located on the exterior of the building, are opened. The pressure coupling 1 is attached to any one of the open faucets 13 having spout threads 15 and the air hose 17 is then attached to the pressure coupling 1, as described above. The air pump is subsequently operated to force air through the air hose 17, valve stem 7, water faucet 13 and the connecting water pipes. Any water remaining in the pipes is forced through the pipes by the air and exits the remaining opened water faucets.

Referring again to FIG. 3 of the drawing, it is understood that the coupling cap 2 may be fixedly mounted on the valve stem 7 or constructed in one piece with the valve stem 7. However, the removable feature of the coupling cup 2 as illustrated may facilitate easier storage of the pressure coupling 1 in many cases.

In addition to the facility for removing water from building water systems, the pressure coupling 1 can also be used to check the systems for leaks by closing all faucets and applying air pressure to the air hose 17, water faucet 13, which is opened, and to the water system lines. In like manner, the pressure coupling 1 can be used to clear water hoses and outside lines, as desired.

While the preferred embodiments of the invention have been described above it will be recognized and understood that various other modifications may be made in the invention and the appended claims are intended to cover all such modifications which may fall within the spirit and scope of the invention.

Having described my invention with the particularity set forth above, what is claimed is:

1. A pressure coupling for directing a unidirectional flow of pressurized air from an air hose connected with an air pump into a threaded water faucet spout connected with a water pipe system, said pressure coupling comprising a valve stem, a cap-shaped faucet receptacle mounted on one end of said valve stem and receptacle threads provided in said faucet receptacle for receiving and threadably engaging the threaded water faucet spout and stem threads provided on said valve stem for threadably engaging the air hose, whereby the pressurized air flows successively through the air hose, the valve stem, the water faucet spout and the water pipe to expel water from the water pipe, responsive to operation of the air pump.

2. The pressure coupling of claim 1 comprising a receptacle bore provided in said faucet receptacle for receiving said valve stem.

3. The pressure coupling of claim 2 comprising bore threads provided in said receptacle bore and connecting threads provided on said one end of said valve stem, whereby said connecting threads engage said bore threads for removably connecting said one end of said valve stem to said faucet receptacle.

4. A pressure coupling for directing a unidirectional flow of pressurized air from an air hose connected with an air pump into a threaded water faucet spout connected with a water pipe system, said pressure coupling comprising a valve stem, a cap-shaped faucet receptacle mounted on one end of said valve stem for receiving and engaging the threaded water faucet spout and stem threads provided on said valve stem for threadably engaging the air hose, whereby the pressurized air flows successively through the air hose, the threaded valve stem, the threaded water faucet spout and the water pipe to expel water from the water pipe, responsive to operation of the air pump.

5. The pressure coupling of claim 4 comprising a receptacle bore provided in said faucet receptacle for receiving said valve stem.

6. The pressure coupling of claim 5 comprising bore threads provided in said receptacle bore and connecting threads provided on said one end of said valve stem, whereby said connecting threads engage said bore threads for removably connecting said one end of said valve stem to said faucet receptacle.

7. The pressure receptacle of claim 4 comprising receptacle threads provided on said faucet receptacle, whereby said faucet receptacle receives and threadably engages the threaded water faucet spout with said receptacle threads.

8. The pressure coupling of claim 7 comprising a receptacle bore provided in said faucet receptacle for receiving said valve stem.

9. The pressure coupling of claim 8 comprising bore threads provided in said receptacle bore and connecting threads provided on said one end of said valve stem, whereby said connecting threads engage said bore threads for removably connecting said one end of said valve stem to said faucet receptacle.

* * * * *